United States Patent
Zhou

(10) Patent No.: US 9,499,940 B2
(45) Date of Patent: Nov. 22, 2016

(54) METHOD FOR PRODUCING ULTRAHIGH-VISCOSITY REFINED COTTON AND DEVICE FOR TRANSPORTING REFINED COTTON PULP

(71) Applicant: HUBEI JINHANJIANG REFINED COTTON CO., LTD., Jingmen (CN)

(72) Inventor: Jiagui Zhou, Wuhan (CN)

(73) Assignee: HUBEI JINHANJIANG REFINED COTTON CO., LTD., Jingmen (CN)

( * ) Notice: Subject to any disclaimer, the term of this patent is extended or adjusted under 35 U.S.C. 154(b) by 0 days.

(21) Appl. No.: 14/692,764

(22) Filed: Apr. 22, 2015

(65) Prior Publication Data

US 2015/0292151 A1 Oct. 15, 2015

Related U.S. Application Data

(63) Continuation-in-part of application No. PCT/CN2013/090872, filed on Dec. 20, 2013.

(30) Foreign Application Priority Data

Dec. 31, 2012 (CN) .......................... 2012 2 0745219
Sep. 9, 2013 (CN) .......................... 2013 1 0404891

(51) Int. Cl.
*D21C 5/00* (2006.01)
*D21C 9/00* (2006.01)
*D21C 9/14* (2006.01)
(Continued)

(52) U.S. Cl.
CPC ................. *D21C 5/00* (2013.01); *B65G 53/06* (2013.01); *D21C 1/06* (2013.01); *D21C 3/02* (2013.01); *D21C 9/001* (2013.01); *D21C 9/002* (2013.01); *D21C 9/004* (2013.01); *D21C 9/005* (2013.01); *D21C 9/12* (2013.01); *D21C 9/18* (2013.01); *D21C 9/10* (2013.01)

(58) Field of Classification Search
CPC ......... D21C 9/001; D21C 9/002; D21C 5/00
See application file for complete search history.

(56) References Cited

FOREIGN PATENT DOCUMENTS

CN 1718874 A * 1/2006
CN 102251422 A * 11/2011
(Continued)

OTHER PUBLICATIONS

Iqbal et al., Textile Environmental Conditioning:Effect of Relative Humidity Varaition on Tensile Properties of Different Fabrics, 2012, Journal of Analytical Sciences, Methods and Instrumentations, 2, pp. 92-97.*

*Primary Examiner* — Anthony Calandra
(74) *Attorney, Agent, or Firm* — Matthias Scholl, PC; Matthias Scholl

(57) ABSTRACT

A method for producing ultrahigh-viscosity refined cotton, including: material selection and cotton opening, impregnation, pretreatment, digestion, bleaching, and pressing and drying. A device for transporting a refined cotton pulp including: a blower, a material bin, valve plates, a central axis, a motor, and a transporting pipe. The material bin includes a mouth-like upper part and a lower part including a first material outlet. A first material outlet is disposed at the lower part of the material bin and communicates with the transporting pipe. One end of the transporting pipe communicates with the blower, and the other end of the transporting pipe functions as a second material outlet. The valve plates are disposed in the material bin via the central axis. The motor is in transmission connection to the central axis.

1 Claim, 1 Drawing Sheet

(51) Int. Cl.
*B65G 53/06* (2006.01)
*D21C 1/06* (2006.01)
*D21C 3/02* (2006.01)
*D21C 9/12* (2006.01)
*D21C 9/18* (2006.01)
*D21C 9/10* (2006.01)

(56) References Cited

FOREIGN PATENT DOCUMENTS

| CN | 103233383 A | * | 8/2013 | |
| CN | WO 2014101867 A1 | * | 7/2014 | ............. B65G 53/06 |
| CN | 104372701 A | * | 2/2015 | |

* cited by examiner

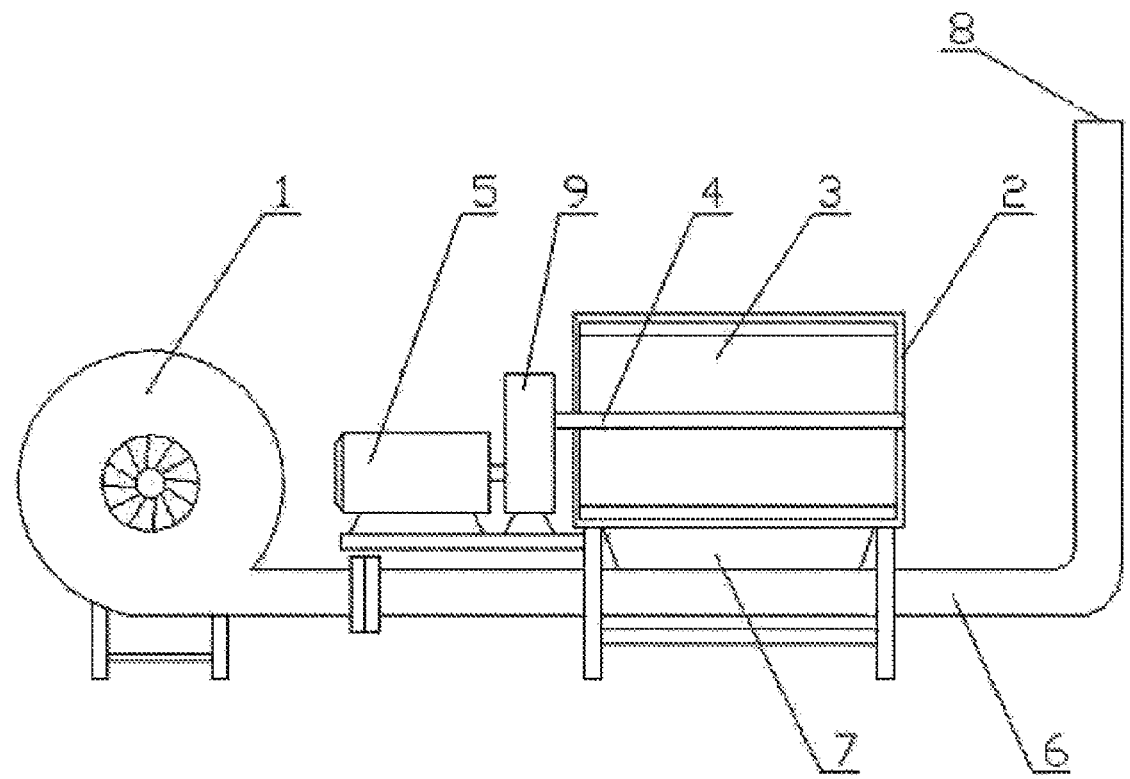

US 9,499,940 B2

METHOD FOR PRODUCING ULTRAHIGH-VISCOSITY REFINED COTTON AND DEVICE FOR TRANSPORTING REFINED COTTON PULP

CROSS-REFERENCE TO RELATED APPLICATIONS

This application is a continuation-in-part of International Patent Application No. PCT/CN2013/090872 with an international filing date of Dec. 30, 2013, designating the United States, now pending, and further claims priority benefits to Chinese Patent Application No. 201220745219.0 filed Dec. 31, 2012, and to Chinese Patent Application No. 201310404891.2 filed Sep. 9, 2013. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND OF THE INVENTION

Field of the Invention

The invention relates to a method for producing ultrahigh-viscosity refined cotton and a device for transporting a refined cotton pulp.

Description of the Related Art

High-viscosity refined cotton has a viscosity exceeding 800 centipoise, and ultrahigh-viscosity refined cotton has a viscosity exceeding 2200 centipoise. However, the current production processes are unable to produce ultrahigh-viscosity refined cotton because the viscosity is largely reduced during impregnation, digestion, and bleaching. First, the impregnation procedure is difficult, and the lye cannot fully penetrate into the linters. Second, the digestion procedure and the bleaching procedure are not specially adjusted to the characteristics of the linters. Third, the bleaching procedure does not include appropriate additives for the bleaching reaction.

A typical method for transporting a cotton pulp after the digestion to a bleaching pool includes: adding the cotton pulp to water and stirring to dilute the cotton pulp to a certain concentration, and pumping the diluted cotton pulp to the bleaching pool via pipes. However, a large amount of water is needed, a large amount of wastewater is produced, and a lye contained in the wastewater is wasted, thus, the transporting method increases the production cost and is environmentally harmful.

SUMMARY OF THE INVENTION

In view of the above-described problems, it is one objective of the invention to provide a method for producing an ultrahigh-viscosity refined cotton. The method features reasonable design, low lye consumption, and the resulting product has ultrahigh viscosity.

It is another objective of the invention to provide a device for transporting a refined cotton pulp. The device has is able to significantly reduce the water consumption and the wastewater production, thereby being beneficial for the recovery of the lye and satisfying the requirements on environment protection.

To achieve the above objective, in accordance with one embodiment of the invention, there is provided a method for producing an ultrahigh-viscosity refined cotton, the method comprising:

1) selecting linters excluding mixed foreign fibers as a raw material, wherein the linters have a fiber length of between 13 and 15 mm, an absolute dryness of 92%, and a maturity of exceeding 80%; and loosening, purifying, and opening the linters;

2) spraying a 7 wt. % sodium hydroxide solution to the linters, controlling a mass ratio of the raw material to the solution to be 1:2.7-3.0; pressing the linters in the presence of a pressure of between 0.18 and 0.2 megapascale to enable the sodium hydroxide solution to fully uniformly penetrate into the linters to form alkali fibers, and controlling a humidity of the alkali fibers to be between 75% and 78%;

3) pressing the alkali fibers in the presence of a pressure of between 2 and 3 megapascale, recovering a lye from the pressing, controlling the humidity of the alkali fibers after the pressing to be between 42% and 45%; and spraying a 70 wt. % fatty alcohol polyoxyethylene ether sodium sulfate (AES) additive to the alkali fibers and pressing the alkali fibers, and repeating operations of the spraying and the pressing for three times, wherein a temperature is controlled at between 25 and 40° C., and the humidity of the alkali fibers after the repeated treatment is controlled to be between 42% and 45%; wherein a time of the whole pretreatment is controlled to be between 8 and 10 min, and a weight ratio of the raw material to the AES additive is 100:0.1;

4) placing the alkali fiber after pretreatment in a sealed spherical digester, gradually increasing a temperature in the spherical digester to 100° C. within between 30 and 35 min, controlling a pressure to be between 0.18 and 0.2 megapascale, idle rotating the spherical digester for between 30 and 35 min; rotating the spherical digester while gradually increasing the temperature therein to between 114 and 116° C. within between 40 and 45 min, and controlling a pressure to be between 0.2 and 0.22 megapascale, and stopping rotating the spherical digester; releasing steam for 10 min so as to remove a part of oxygen from the spherical digester and to prevent oxidation and viscosity decrease; continuing to rotate the spherical digester while gradually increasing the temperature to between 120 and 125° C. within between 40 and 45 min, controlling the pressure to be between 0.25 and 0.28 megapascale, and releasing the steam again after maintaining the temperature for 30 min; and recovering the lye, and discharging a cotton pulp when the temperature is decreased to 100° C.;

5) washing the cotton pulp after digestion for a first time for between 15 and 18 min, controlling a pH value to be between 7.0 and 7.5 and a concentration of the cotton pulp to be 5%; adding a 99.9 wt. % ethylenediamine tetraacetic acid (EDTA) additive and chlorine dioxide solution having a concentration of between 0.14 and 0.17 wt. % successively to the cotton pulp for conducting a first bleaching, stirring for 50 min and filtering the cotton pulp for 50 min to remove water therefrom; washing the cotton pulp for a second time for between 20 and 25 min, controlling the pH value to be between 5 and 6, processing the cotton pulp with a 30 wt. % sodium hydroxide solution for 40 min, and then filtering the cotton pulp for 50 min to remove water therefrom; washing the cotton pulp for a third time for between 15 and 20 min, and controlling the pH value thereof to be between 7.0 and 7.5; conducting a second bleaching using a chlorine dioxide solution having a concentration of between 0.14 and 0.17 wt. %, stirring for 30 min and filtering the cotton pulp for 40 min to remove water therefrom, regulating a concentration of the cotton pulp to be 5 wt. % by adding water; and adding a $Na_2S_2O_3$ solution having a concentration of between 25 and 30 wt. % to the cotton pulp for dechlorination for 10 min, washing a resulting cotton pulp for between 15 and 20 min, and controlling a pH value of between 6.8 and 7.0; wherein a weight ratio of the raw material to the EDTA additive is 100:0.075, an amount of chlorine dioxide in the first bleaching satisfies that a weight ratio of the raw material to chlorine dioxide is 100:190-200, an amount of chlorine dioxide in the second bleaching satisfies that a weight ratio of the raw material to chlorine dioxide is 100:70-75, an amount of sodium hydroxide satisfies that a ratio of the raw material to sodium hydroxide is 100:1.75-2.0, and an amount of $Na_2S_2O_3$ satisfies that a ratio of the raw material to $Na_2S_2O_3$ is 100:0.375-0.5; and 6) processing the cotton pulp after the bleaching by two-stage pressing, whereby enabling a water content of the cotton pulp to be below 48 wt. %, and drying the cotton pulp to yield a product, whereby reaching a viscosity of exceeding 2200 centipoise.

In accordance with another embodiment of the invention, there is provided a device for transporting a refined cotton pulp. The device comprises: a blower; a material bin, the material bin comprising a mouth-like upper part and a lower part comprising a first material outlet; valve plates; a central axis; a motor; and a transporting pipe, the transporting pipe comprising two ends. A first material outlet is disposed at the lower part of the material bin and communicates with the transporting pipe. One end of the transporting pipe communicates with the blower, and the other end of the transporting pipe functions as a second material outlet. The valve plates are disposed in the material bin via the central axis. The motor is in transmission connection to the central axis.

In a class of this embodiment, a number of the valve plates is between 3 and 6, and the valve plates are radially fixed on the central axis.

Advantages according to embodiments of the invention are summarized as follows:

The production process of the invention is advantageous in the following respects: 1) The pretreatment procedure is added before the digestion procedure, the alkali fibers after the impregnation are repeatedly conducted with spraying and pressing under the action of a specific additive, and the temperature is preliminarily increased before the idle rotation of the spherical digester, thereby enabling the lye to fully uniformly penetrate into the fibers and providing a good base for subsequent digestion for improving the viscosity of the product. 2) In the pretreatment procedure, the lye pressed out is recovered, so that the use of the lye is reduced, thereby effectively lowering the lye cost. 3) The digestion procedure is properly designed according to the characteristic of the linters, that is, multi-stage digestion at different temperatures and pressures is adopted, thereby satisfying the requirements for improving the viscosity of the product. 4) In the bleaching procedure, the EDTA additive is used for preliminary bleaching, and two-stage bleaching is adopted. By adopting multiple washing and bleaching treatments under the action of the additive and the specific environment, the requirement on the white degree as well as the purpose for a stable product viscosity is reached.

The transporting device of the invention is advantageous in that the cotton pulp after the digestion is directly transported to a bleaching pool by the transporting device, and water is not needed to dilute the digested cotton pulp. Not only the water consumption but also the sewage production is greatly reduced, so that the transporting device is beneficial for the environment protection and largely decreases the production cost. The transporting device can be used in the production procedure of the invention and can also substitute the conventional transporting device in the existing production process of the refined cotton.

BRIEF DESCRIPTION OF THE DRAWINGS

The invention is described hereinbelow with reference to accompanying drawings, in which the sole FIGURE is a structure diagram showing a device for transporting a refined cotton pulp according to one embodiment of the invention.

In the drawings, the following reference numbers are used: 1. Blower; 2. Material bin; 3. Valve plate; 4. Central axis; 5. Motor; 6. Transporting pipe; 7. First material outlet; 8. Second material outlet; and 9. Speed reducer.

DETAILED DESCRIPTION OF THE EMBODIMENTS

For further illustrating the invention, experiments detailing a method for producing an ultrahigh-viscosity refined cotton and a device for transporting a refined cotton pulp are described below. It should be noted that the following examples are intended to describe and not to limit the invention.

Example 1

A method for producing an ultrahigh-viscosity refined cotton is specifically conducted as follows:

1) Material selection and cotton opening: 4000 kg of highly qualified linters excluding mixed foreign fibers are selected as a raw material. The linters have a fiber length of between 13 and 15 mm, an absolute dryness of 92%, and a maturity of exceeding 80%. And the linters are then loosened and separated from impurities to allow the cotton bolls to open.

2) Impregnation: a 7 wt. % sodium hydroxide solution is sprayed on the linters after the loosening, impurity removal, and cotton opening treatments, and a mass ratio of the raw material to the solution is 1:2.7. Thereafter, a resulting mixture is pressed at a pressure of 0.18 megapascale to allow the sodium hydroxide solution to fully uniformly penetrate into the linters to form alkali fibers. A humidity of the alkali fibers is controlled at 78%.

3) Pretreatment: the alkali fibers after fully uniform impregnation in alkali are pressed by a pressure of 2 megapascale. A lye being pressed out is recovered and reused, and the humidity of the alkali fibers after the pressing is controlled at 45%. After that, the alkali fibers are sprayed with 4 kg of a 70 wt. % AES additive and subsequently pressed, the operations are repeated for three times, during which, a temperature is controlled at 25° C. The humidity after the repeated treatment is controlled at 45%, and a duration for the whole pretreatment is controlled at 8 min.

4) Digestion: the alkali fibers after the pretreatment are added to a sealed spherical digester. A temperature inside the spherical digester is increased to 100° C. within 30 min, and a pressure therein is controlled at 0.18 megapascale. The spherical digester is idle rotated for 30 min, and then continued rotating while increasing the temperature. The temperature in the spherical digester is gradually increased to 114° C. within 40 min, and a pressure is controlled at 0.20 megapascale; then, the spherical digester is stopped rotating, steam is discharged therefrom for 10 min so as to remove a part of oxygen from the spherical digester and to prevent oxidation and viscosity reduction; thereafter, the spherical digester is continued to rotate and to increase the temperature, the temperature therein is gradually increased to 120° C. within 40 min, and the pressure therein is controlled at 0.25 megapascale; and finally, after 30 min of temperature maintenance, the steam therein is discharged again, the lye is recovered, and the cotton pulp is discharged from the spherical digester when the temperature therein is decreased to 100° C.

5) Bleaching: the cotton pulp after digesting is washed for a first time for 15 min. A pH value is controlled at 7.5, and a concentration of the cotton pulp is controlled at 5 wt. %. 3 kg of a 99.9 wt. % EDTA additive is added, and then 8000 kg of a 0.14 wt. % chlorine dioxide solution is added to conduct a first bleaching. A resulting mixture is stirred for 50 min and then filtered for 50 min to remove water therefrom. Subsequently, the cotton pulp is washed for a second time for 20 min. The pH value is controlled at 6. The cotton pulp is processed by 70 kg of a 30 wt. % sodium hydroxide solution and then filtered for 50 min to remove water therefrom. Thereafter, the above cotton pulp is washed for a third time for 15 min. The pH value thereof is controlled at 7.5, and 3000 kg of a 0.14 wt. % chlorine dioxide solution is used to perform a second bleaching, and after 30 min stirring, the cotton pulp is filtered for 40 min to remove water therefrom. The cotton pulp is then added with water to recover the concentration thereof to be 5 wt. %. 20 kg of a 25 wt. % $Na_2S_2O_3$ solution is added to the cotton pulp for dechlorination for 10 min Finally, the cotton pulp is washed for 15 min, and the pH value is controlled at 6.8.

6) Pressing and drying: the cotton pulp after the bleaching are processed by two-stage pressing to enable a water content of the cotton pulp to be 48% below. Finally, the cotton pulp is dried to yield a product. A viscosity of the product reaches 2230 centipoise.

Example 2

A method for producing an ultrahigh-viscosity refined cotton is specifically conducted as follows:

1) Material selection and cotton opening: 4000 kg of highly qualified linters excluding mixed foreign fibers are selected as a raw material. The linters have a fiber length of between 13 and 15 mm, an absolute dryness of 92%, and a maturity of exceeding 80%. And the linters are then loosened and separated from impurities to allow the cotton bolls to open.

2) Impregnation: a 7 wt. % sodium hydroxide solution is sprayed on the linters after the loosening, impurity removal, and cotton opening treatments, and a mass ratio of the raw material to the solution is 1:3.0. Thereafter, a resulting mixture is pressed at a pressure of 0.20 megapascale to allow the sodium hydroxide solution to fully uniformly penetrate into the linters to form alkali fibers. A humidity of the alkali fibers is controlled at 75%.

3) Pretreatment: the alkali fibers after fully uniform impregnation in alkali are pressed by a pressure of 3 megapascale. A lye being pressed out is recovered and reused, and the humidity of the alkali fibers after the pressing is controlled at 42%. After that, the alkali fibers are sprayed with 4 kg of a 70 wt. % AES additive and subsequently pressed, the operations are repeated for three times, during which, a temperature is controlled at 40° C. The humidity after the repeated treatment is controlled at 42%, and a duration for the whole pretreatment is controlled at 10 min.

4) Digestion: the alkali fibers after the pretreatment are added to a sealed spherical digester. A temperature inside the spherical digester is increased to 100° C. within 35 min, and a pressure therein is controlled at 0.20 megapascale. The spherical digester is idle rotated for 35 min, and then continued rotating while increasing the temperature. The temperature in the spherical digester is gradually increased to 116° C. within 45 min, and a pressure is controlled at 0.22 megapascale; then, the spherical digester is stopped rotating, steam is discharged therefrom for 10 min so as to remove a part of oxygen from the spherical digester and to prevent oxidation and viscosity reduction; thereafter, the spherical digester is continued to rotate and to increase the temperature, the temperature therein is gradually increased to 125° C. within 45 min, and the pressure therein is controlled at 0.28 megapascale; and finally, after 30 min of temperature maintenance, the steam therein is discharged again, the lye is recovered, and the cotton pulp is discharged from the spherical digester when the temperature therein is decreased to 100° C.

5) Bleaching: the cotton pulp after digesting is washed for a first time for 18 min. A pH value is controlled at 7.0, and a concentration of the cotton pulp is controlled at 5 wt. %. 3 kg of a 99.9 wt. % EDTA additive is added, and then 7600 kg of a 0.17 wt. % chlorine dioxide solution is added to conduct a first bleaching. A resulting mixture is stirred for 50 min and then filtered for 50 min to remove water therefrom. Subsequently, the cotton pulp is washed for a second time for 25 min. The pH value is controlled at 5, and the cotton pulp is processed by 80 kg of a 30 wt. % sodium hydroxide solution for 40 min and then filtered for 50 min to remove water therefrom. Thereafter, the above cotton pulp is washed for a third time for 20 min. The pH value thereof is controlled at 7.0, and 2800 kg of a 0.17 wt. % chlorine dioxide solution is used to perform a second bleaching, and after 30 min stirring, the cotton pulp is filtered for 40 min to remove water therefrom. The cotton pulp is then added with water to recover the concentration thereof to be 5 wt. %. 15 kg of a 30 wt. % $Na_2S_2O_3$ solution is added to the cotton pulp for dechlorination for 10 min. Finally, the cotton pulp is washed for 20 min, and the pH value is controlled at 7.0.

6) Pressing and drying: the cotton pulp after the bleaching are processed by two-stage pressing to enable a water content of the cotton pulp to be 48% below. Finally, the cotton pulp is dried to yield a product. A viscosity of the product reaches 2250 centipoise.

Example 3

A method for producing an ultrahigh-viscosity refined cotton is specifically conducted as follows:

1) Material selection and cotton opening: 4000 kg of highly qualified linters excluding mixed foreign fibers are selected as a raw material. The linters have a fiber length of between 13 and 15 mm, an absolute dryness of 92%, and a maturity of exceeding 80%. And the linters are then loosened and separated from impurities to allow the cotton bolls to open.

2) Impregnation: a 7 wt. % sodium hydroxide solution is sprayed on the linters after the loosening, impurity removal, and cotton opening treatments, and a mass ratio of the raw material to the solution is 1:2.8. Thereafter, a resulting mixture is pressed at a pressure of 0.19 megapascale to allow the sodium hydroxide solution to fully uniformly penetrate into the linters to form alkali fibers. A humidity of the alkali fibers is controlled at 76%.

3) Pretreatment: the alkali fibers after fully uniform impregnation in alkali are pressed by a pressure of 2.8 megapascale. A lye being pressed out is recovered and reused, and the humidity of the alkali fibers after the pressing is controlled at 43%. After that, the alkali fibers are sprayed with 4 kg of a 70 wt. % AES additive and subsequently pressed, the operations are repeated for three times, during which, a temperature is controlled at 33° C. The humidity after the repeated treatment is controlled at 43%, and a duration for the whole pretreatment is controlled at 9 min.

4) Digestion: the alkali fibers after the pretreatment are added to a sealed spherical digester. A temperature inside the spherical digester is increased to 100° C. within 32 min, and a pressure therein is controlled at 0.19 megapascale. The spherical digester is idle rotated for 32 min, and then continued rotating while increasing the temperature. The temperature in the spherical digester is gradually increased to 115° C. within 43 min, and a pressure is controlled at 0.21 megapascale; then, the spherical digester is stopped rotating, steam is discharged therefrom for 10 min so as to remove a part of oxygen from the spherical digester and to prevent oxidation and viscosity reduction; thereafter, the spherical digester is continued to rotate and to increase the temperature, the temperature therein is gradually increased to 122° C. within 44 min, and the pressure therein is controlled at 0.26 megapascale; and finally, after 30 min of temperature maintenance, the steam therein is discharged again, the lye is recovered, and the cotton pulp is discharged from the spherical digester when the temperature therein is decreased to 100° C.

5) Bleaching: the cotton pulp after digesting is washed for a first time for 16 min. A pH value is controlled at 7.2, and a concentration of the cotton pulp is controlled at 5 wt. %. 3 kg of a 99.9 wt. % EDTA additive is added, and then 7900 kg of a 0.15 wt. % chlorine dioxide solution is added to conduct a first bleaching. A resulting mixture is stirred for 50 min and then filtered for 50 min to remove water therefrom. Subsequently, the cotton pulp is washed for a second time for 24 min. The pH value is controlled at 5.6, and the cotton pulp is processed by 76 kg of a 30 wt. % sodium hydroxide solution for 40 min and then filtered for 50 min to remove water therefrom. Thereafter, the above cotton pulp is washed for a third time for 18 min. The pH value thereof is controlled at 7.3, and 2900 kg of a 0.15 wt. % chlorine dioxide solution is used to perform a second bleaching, and after 30 min stirring, the cotton pulp is filtered for 40 min to remove water therefrom. The cotton pulp is then added with water to recover the concentration thereof to be 5 wt. %. 16 kg of a 28 wt. % $Na_2S_2O_3$ solution is added to the cotton pulp for dechlorination for 10 min. Finally, the cotton pulp is washed for 19 min, and the pH value is controlled at 6.9.

6) Pressing and drying: the cotton pulp after the bleaching are processed by two-stage pressing to enable a water content of the cotton pulp to be 48% below. Finally, the cotton pulp is dried to yield a product. The product is tested by Petrochemical Products & Chemical Reagent Quality Supervision Inspection Station, Hubei Province. A viscosity of the product reaches 2280 centipoise.

The AES in the above refers to fatty alcohol polyoxyethylene ether sodium sulfate, and the EDTA refers to ethylenediamine tetraacetic acid.

In the above examples, the cotton pulp after the digestion is transported to a bleaching pool for washing and bleaching via the following dry transporting device.

As shown in the sole FIGURE, a device for transporting the refined cotton pulp mainly comprises: a blower 1, a material bin 2 comprising a mouth-like upper part, valve plates 3, a central axis 4, a motor 5, and a transporting pipe 6 comprising one end communicating with the blower 1. A lower part of the material bin 2 comprises a first material outlet 7. The first material outlet 7 communicates with the transporting pipe 6, and the other end of the transporting pipe 6 functions as a second material outlet 8. Between 3 and 6 valve plates 3 are radially fixed on the central axis 4. Both the central axis 4 and the valve plates 3 are disposed inside the material cabin 2. A motor 5 is in transmission connection with the central axis 4 via a speed reducer 9.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for producing ultrahigh-viscosity refined cotton, the method comprising:
   1) selecting linters excluding mixed foreign fibers as a raw material, wherein the linters have a fiber length of between 13 and 15 mm, an absolute dryness of 92%, and a maturity of exceeding 80%; and loosening, purifying, and opening the linters; followed by
   2) spraying a 7 wt. % sodium hydroxide solution onto the linters, controlling a mass ratio of the linters to the sodium hydroxide solution to be 1:2.7-3.0; pressing the linters at an absolute pressure of between 0.18 and 0.2 megapascal to enable the sodium hydroxide solution to fully-uniformly penetrate into the linters to form alkali fibers, and controlling a relative humidity of the alkali fibers to be between 75% and 78%;
   3) pretreating the alkali fibers obtained in 2), the pretreating comprising: pressing the alkali fibers at an absolute pressure of between 2 and 3 megapascal, recovering a lye from the pressing, controlling the relative humidity of the alkali fibers after the pressing to be between 42% and 45%; and spraying a 70 wt. % fatty alcohol polyoxyethylene ether sodium sulfate (AES) additive to the alkali fibers and pressing the alkali fibers, and repeating operations of the spraying and the pressing for three times,
   wherein
      controlling a temperature at between 25 and 40° C., and controlling the relative humidity of the alkali fibers to be between 42% and 45% after the repeated operations of the spraying and the pressing for three times;
      a time of pretreating the alkali fibers is between 8 and 10 min, and
      a weight ratio of the alkali fibers to the AES additive is 100:0.1;
   4) placing the alkali fibers obtained in 3) in a sealed spherical digester, gradually increasing a temperature in the spherical digester to 100° C. within between 30 and 35 min, controlling an absolute pressure to be between 0.18 and 0.2 megapascal, idle rotating the spherical digester for between 30 and 35 min; rotating the spherical digester while gradually increasing the temperature therein to between 114 and 116° C. within between 40 and 45 min, and controlling an absolute pressure to be between 0.2 and 0.22 megapascal, and stopping rotating the spherical digester; releasing steam for 10 min so as to remove a part of oxygen from the spherical digester and to prevent oxidation and viscosity decrease; continuing to rotate the spherical digester while gradually increasing the temperature to between 120 and 125° C. within between 40 and 45 min, controlling the absolute pressure to be between 0.25 and 0.28 megapascal, and releasing the steam again after maintaining the temperature for 30 min; and recovering the lye, and discharging a cotton pulp when the temperature is decreased to 100° C.;

5) washing the cotton pulp after digestion for a first time for between 15 and 18 min, controlling a pH value to be between 7.0 and 7.5 and a concentration of the cotton pulp to be 5%; adding a 99.9 wt. % ethylenediamine tetraacetic acid (EDTA) additive and chlorine dioxide solution having a concentration of between 0.14 and 0.17 wt. % successively to the cotton pulp for conducting a first bleaching, stirring for 50 min and filtering the cotton pulp for 50 min to remove water therefrom; washing the cotton pulp for a second time for between 20 and 25 min, controlling the pH value to be between 5 and 6, processing the cotton pulp with a 30 wt. % sodium hydroxide solution for 40 min, and then filtering the cotton pulp for 50 min to remove water therefrom; washing the cotton pulp for a third time for between 15 and 20 min, and controlling the pH value thereof to be between 7.0 and 7.5; conducting a second bleaching using a chlorine dioxide solution having a concentration of between 0.14 and 0.17 wt. %, stirring for 30 min and filtering the cotton pulp for 40 min to remove water therefrom, regulating a concentration of the cotton pulp to be 5 wt. % by adding water; and adding a $Na_2S_2O_3$ solution having a concentration of between 25 and 30 wt. % to the cotton pulp for dechlorination for 10 min, washing the cotton pulp for between 15 and 20 min, and controlling a pH value of between 6.8 and 7.0; wherein a weight ratio of the cotton pulp to the EDTA additive is 100:0.075, an amount of chlorine dioxide in the first bleaching satisfies that a weight ratio of the cotton pulp to chlorine dioxide is 100:190-200, an amount of chlorine dioxide in the second bleaching satisfies that a weight ratio of the cotton pulp to chlorine dioxide is 100:70-75, an amount of sodium hydroxide satisfies that a ratio of the cotton pulp to sodium hydroxide is 100:1.75-2.0, and an amount of $Na_2S_2O_3$ satisfies that a ratio of the cotton pulp to $Na_2S_2O_3$ is 100:0.375-0.5; and 6) processing the cotton pulp obtained in 5) by two-stage pressing, whereby enabling a water content of the cotton pulp to be below 48 wt. %, and drying the cotton pulp to yield a product.

\* \* \* \* \*